Dec. 30, 1969 R. D. WALL 3,487,363

ASYNCHRONOUS PARITY CHECKING CIRCUIT

Filed Aug. 31, 1967 2 Sheets-Sheet 1

INVENTOR
R. D. WALL
BY
C. E. Hirsch, Jr.
ATTORNEY

United States Patent Office 3,487,363
Patented Dec. 30, 1969

3,487,363

ASYNCHRONOUS PARITY CHECKING CIRCUIT

Richard D. Wall, Morris Plains, N.J., assignor to Bell Telephone Laboratories, Incorporated, Murray Hill and Berkeley Heights, N.J., a corporation of New York Filed Aug. 31, 1967, Ser. No. 664,769
Int. Cl. G06f 11/00
U.S. Cl. 340—146.1 8 Claims

ABSTRACT OF THE DISCLOSURE

Parity of a parallel binary word may be checked by converting the parallel word into serial form, counting signals representative of the serial word and interrogating the output of the counter.

BACKGROUND OF THE INVENTION

Field of the invention

This invention relates to the processing of digital information and, more specifically, to checking parity of a binary word.

Description of the prior art

In digital transmission systems or the like, it becomes necessary to detect errors. A single error in a code combination, or binary word, may produce another word that is also in the code scheme. These errors are often detected by utilizing a parity check. Many different parity checking schemes have been used. For example, a typical scheme for checking parity of a parallel-bit word is the logic "tree" which utilizes a plurality of Exclusive-OR gates. The parallel binary signal is propagated through the gates of the "tree" and the resultant output indicates whether even or odd parity is violated. This system, however, is undesirable in many applications due to the large number of circuit components that are required.

In another scheme for checking parity of a parallel-bit word, or code combination, the word is first converted into series form. Pulses indicative of the "1" (or "0") state of the series are counted and the resultant count is interrogated to determine parity. One such system is disclosed in Patent 2,719,959, issued to L. C. Hobbs on Oct. 4, 1955. To convert a parallel bit word into serial form, Hobbs utilizes a plurality of bistable circuit elements which are first set by the incoming binary word and then sequentially reset to their initial condition by signals generated in a complex clock mechanism. The outputs of the bistable elements are differentiated and then applied to an OR gate; the resultant series of pulses toggles still another bistable element. The output signal from this bistable element is applied to an AND gate where it is interrogated for parity. Signals necesary for interrogating the AND gate are also generated in the complex clock mechanism. Problems with this type system are that an elaborate timing mechanism is required, and that the clock mechanism for interrogating the AND gate and triggering the bistable elements must be carefully synchronized with the parallel-bit word input. Obviously, errors in synchronization would result in an erroneous parity check.

SUMMARY OF THE INVENTION

Therefore, it is an object of this invention to improve parity check circuits.

Another object of the invention is to simplify the design of a parity checking circuit.

Still another object of this invention is to provide a completely asynchronous parity checking circuit.

In accordance with this invention, these and other objects are accomplished in a parity checking circuit that includes apparatus for converting a parallel-bit binary word into serial form. The series conversion is accomplished by first progressively delaying or stretching signals representative of the parallel binary word. A pulse is then generated in response to the trailing edge of the delayed or stretched signals. The resultant serial digital signal is applied to toggle a bistable element whose output in turn is applied to an AND gate. Parity is determined by interrogating the AND gate. Signals for interrogating the AND gate may be generated, in accordance with this invention, by applying the stretched or delayed signals to a gate circuit. The output of the gate circuit is in turn applied to a pulse generator which is triggered by the trailing edge of the longest stretched pulse, that is, a signal indicative of the last pulse of the serially converted word. The interrogation signal, in addition to being applied to interrogate the AND gate, is also delayed and then applied to the bistable element for resetting it to its initial condition.

These and other objects and advantages of the invention will be more fully understood from the following detailed description of an illustrative embodiment thereof taken in connection with the appended drawings.

DETAILED DESCRIPTION OF THE INVENTION

Figure 1:
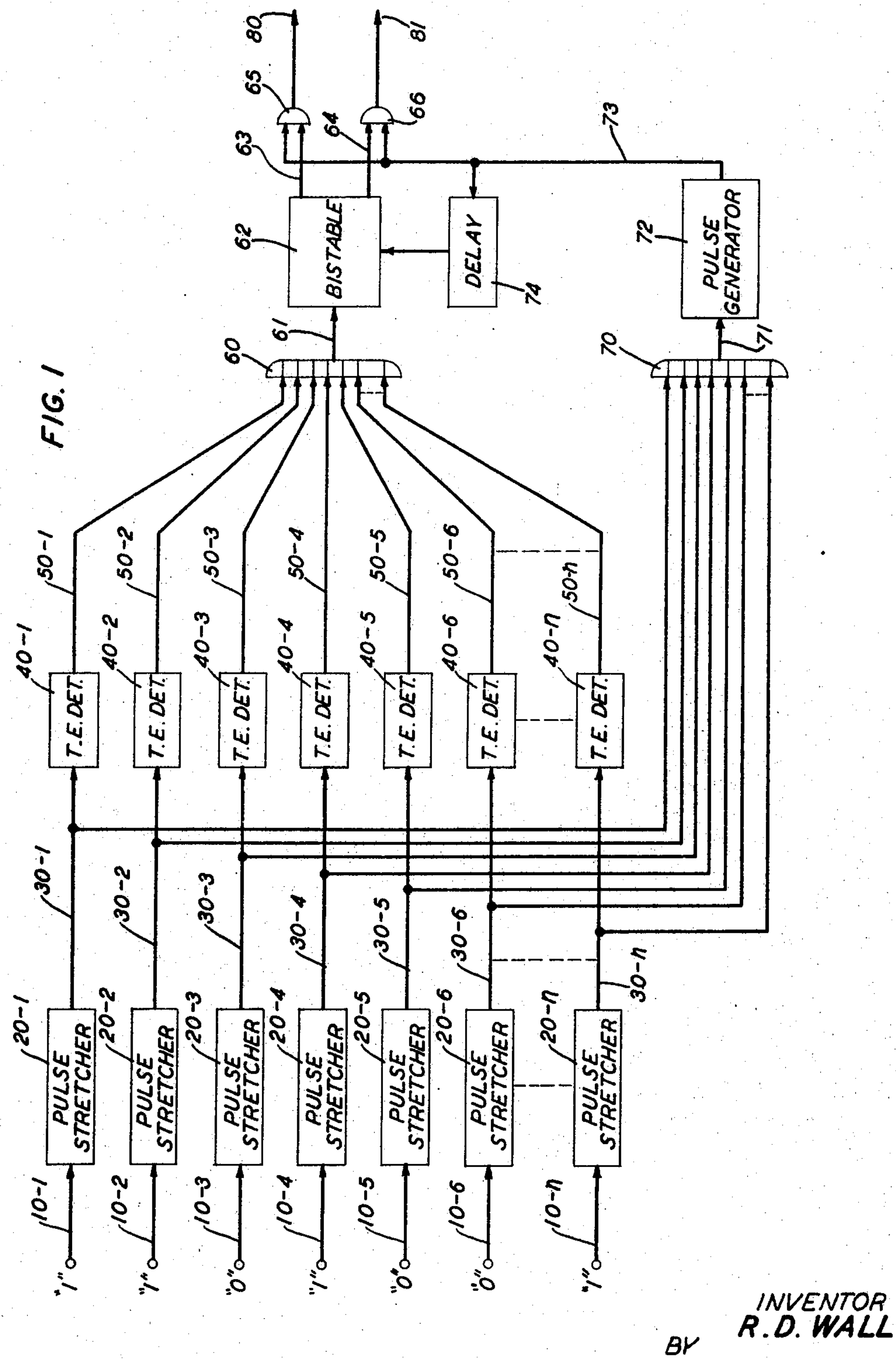
FIG. 1 is a schematic diagram of a parity checking circuit that illustrates the principles of the present invention.

FIG. 1 illustrates a detailed embodiment of a parity checking circuit for use with $n$ data transmission channels. However, for brevity, it will be assumed that there are only seven channels, i.e., $n=7$. A typical parallel bit binary word to be checked may take the form 1101001. Thus, signals representative of the binary word are supplied to input terminals 10–1 through 10–7 ($n=7$) of pulse stretchers 20–1 through 20–7, respectively. The pulse stretchers may be of any desired form. Preferably, they comprise a circuit having only one stable condition, for example, a monostable multivibrator. Initially, pulse stretchers 20–1 through 20–7 are in the stable or low (0) output condition. A signal representative of a (1) applied to the input, triggers the pulse stretcher causing its output to change to the high (1) condition. The particular output will stay high for a predetermined period of time, this period being progressively longer for each subsequent pulse stretcher. Outputs from the pulse stretchers are applied to trailing edge detectors 40–1 through 40–7, respectively, and to OR gate 70.

Trailing edge detectors 40–1 through 40–7 may take on any of a number of forms. They may be, for example, either a differentiating circuit or a monostable multivibrator. Pulses obtained from the detectors at 50–1 through 50–7, respectively, are applied to OR gate 60 and the resultant output at 61 is thus a series representation of the parallel binary input. These pulses, i.e., at 61, trigger bistable element 62 which may be an ordinary multivibrator having two stable states and provisions for toggling and for resetting to its initial condition. The bistable outputs 63 and 64 are applied to AND gates 65 and 66, respectively. AND gate 65 is interrogated for even parity, while AND gate 66 is interrogated for odd parity.

The necessary interrogation signal applied to the other input of AND gates 65 and 66 is generated by pulse generator 72 which may be, for example, a monostable multivibrator that is triggered by the output of OR gate 70. The interrogation pulse, in addition to being applied to AND gates 65 and 66, is also delayed by element 74 until interrogation is accomplished. Thereafter, the delayed signal is applied to reset bistable element 62 to its initial condition.

Figure 2A:
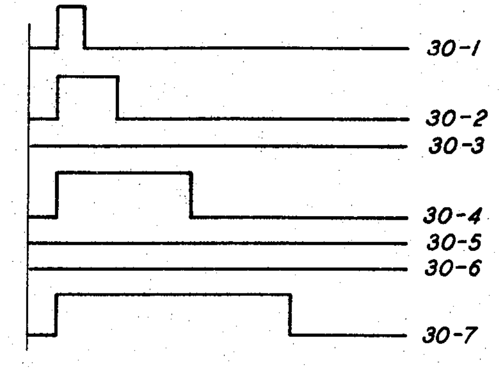
FIG. 2A shows pulses representative of stretched input signals utilized in the apparatus of FIG. 1.
Figure 2B:
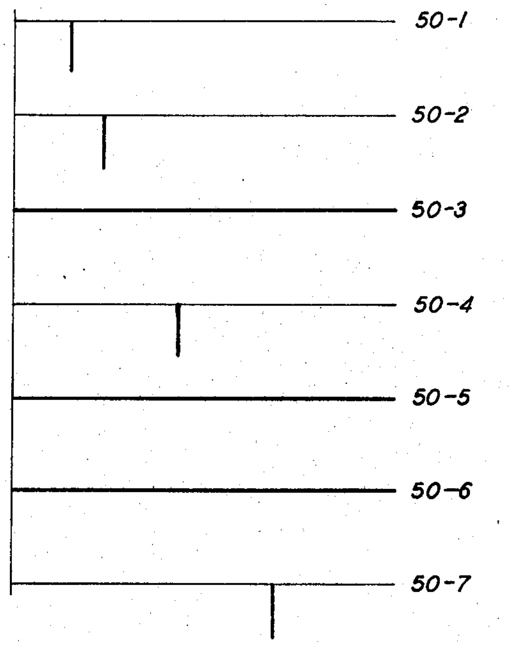
FIG. 2B graphically depicts pulse indicative of the trailing edges of the signals of FIG. 2A.
Figure 2C:
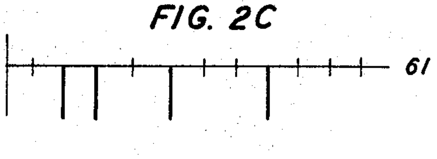
FIG. 2C shows the serial conversion of a parallel-bit input word.

In operation, pulse stretchers 20–1 through 20–7, ($n$=7) are initially in their stable state, that is, their outputs are in a low (0) condition. In checking for even parity, for example, of the parallel word 1101001, signals representative of the digits of the parallel word are applied to inputs 10–1 through 10–7. These signals trigger pulse stretchers 20–1, 20–2, 20–4, and 20–7, respectively, transferring them from the initial low (0) state to the high (1) state. Only signals representative of the (1) binary state trigger the pulse stretching circuits. Waveforms of the resultant outputs at 30–1 through 30–7 are shown in FIG. 2A. Trailing edge detectors 40–1 through 40–7 will each sense a respective one of outputs 30–1 through 30–7 and generate pulses indicative of the trailing edges of those outputs, as shown in FIG. 2B. These pulses are in turn applied to OR gate 60 whose output at 61 is the series representation, shown in FIG. 2C, of the parallel-bit input. Bistable element 62 whose output 63 is initially in the low (0) state is toggled by the series of pulses. Since bistable 62 was toggled an even number of times, four in this example, the resultant output at 63 will be low (0). Conversely, the output at 64 will be high. The low condition is applied to one input of AND gate 65 while the high condition is applied to one input of AND gate 66.

Pulse stretcher outputs 30–1 through 30–7 are also applied to OR gate 70 whose output at 71 will remain in a high condition until the termination of the longest stretched signal, in this instance output 30–7. Pulse generator 72 is arranged to generate a pulse of short duration when triggered by a negative going signal, that is, the trailing edge of output 30–7. The pulse output from generator 72 is applied to the other input of AND gates 65 and 66 to interrogate them for parity. Since the bistable output signal at 63 is low, and the interrogation signal at 73 is high, there will be no output from gate 65 at 80. Therefore, even parity is not violated. However, since the interrogation pulse at 73 is high and the bistable output 64 is high, the output 81 of AND gate 66 will be high, indicating violation of odd parity. Thus, signals from output terminals 80 and 81 may be used as desired to indicate whether even or odd parity, respectively, is violated.

Additionally, it is to be understood that the above-described arrangements are only illustrative of the application of the principles of this invention. Numerous other arrangements may be devised by those skilled in the art without departing from the spirit and scope of the invention.

What is claimed is:

1. A parity checking circuit comprising,
means for converting a parallel binary word into serial form, said converting means including means responsive to signals representative of said parallel binary word for progressively delaying said parallel binary word signals,
binary counting means for counting signals representative of a serial word,
gate means for interrogating the output from said binary counting means, and
means responsive to signals representative of said delayed signals for generating a signal to interrogate said gate means.

2. A parity checking circuit as defined in claim 1 wherein said generating means includes, an OR gate, and a pulse generator responsive to the output from said OR gate.

3. A parity checking circuit as defined in claim 1 further including means responsive to said interrogating signal for resetting said binary counting means to its initial condition.

4. A parity checking circuit which comprises,
a plurality of pulse stretching circuits responsive to signals representative of a parallel binary word,
means responsive to output signals from said pulse stretching circuits for generating signals indicative of the trailing edges of said output signals,
first gate means responsive to said trailing edge signals for obtaining a serial pulse combination,
binary counting means for counting signals representative of said serial pulse combination,
second gate means for interrogating the output from said binary counting means, and
means responsive to signals representative of said serial word for generating a signal to interrogate said second gate means.

5. A parity checking circuit which comprises,
a plurality of pulse stretcher circuits each responsive to a selected input signal,
a plurality of detector circuits each responsive to a selected one of the output signals from said pulse stretchers,
a first OR gate responsive to the output signals from said detectors for obtaining a series of signals representative of said binary word,
a counter for counting signals representative of said series,
and AND gate for interrogating the output of said counter,
a second OR gate responsive to the output signals from said pulse stretchers, and
a pulse generator responsive to the output signals from said second OR gate for generating a signal to interrogate said AND gate.

6. A partity checking circuit as defined in claim 5 wherein said detectors are differentiating circuits.

7. A partity checking circuit as defined in claim 6 wherein said pulse stretchers comprise monostable multivibrators.

8. A circuit for checking coded signals comprising,
a plurality of monostable multivibrators, each of said multivibrators being responsive to a selected input signal,
a plurality of differentiating circuits each responsive to a seletced one of the output signals from said multivibrators,
a first OR gate responsive to the output signals from said differentiators for obtaining signals representative of a serial binary word,
a bistable multivibrator for counting selected ones of said binary word signals,
AND gate means for interrogating the output signals from said bistable multivibrator,
a second OR gate to which the output signals from said multivibrators are applied,
a pulse generator responsive to the trailing edge of the output signal from said second OR gate for generating a signal to interrogate said AND gate means, and
delay means responsive to said interrogating signal for obtaining a signal to reset said bistable multivibrator.

References Cited

UNITED STATES PATENTS

| | | | |
|---|---|---|---|
| 2,719,959 | 10/1955 | Hobbs | 340—146.1 X |
| 3,024,444 | 3/1962 | Barry et al. | 340—146.1 X |
| 3,193,812 | 7/1965 | Friend | 340—174.1 |
| 3,234,364 | 2/1966 | Marko | 340—146.1 X |

EUGENE G. BOTZ, Primary Examiner

C. E. ATKINSON, Assistant Examiner

U.S. Cl. X.R.

235—153; 340—174.1